(12) United States Patent
Volotsenko

(10) Patent No.: US 6,773,059 B2
(45) Date of Patent: Aug. 10, 2004

(54) CONVERTIBLE DEVICE FOR SITTING

(76) Inventor: Dmitriy Volotsenko, 2 W. End Ave., Apt. 2E, Brooklyn, NY (US) 11235

( * ) Notice: Subject to any disclaimer, the term of this patent is extended or adjusted under 35 U.S.C. 154(b) by 0 days.

(21) Appl. No.: 10/299,068

(22) Filed: Nov. 19, 2002

(65) Prior Publication Data

US 2004/0094999 A1 May 20, 2004

(51) Int. Cl.[7] .......................... A47C 13/00; A47C 7/62; A47C 15/00; A47C 7/02; A47B 39/00
(52) U.S. Cl. .................. 297/129; 297/188.01; 297/233; 297/234; 297/235; 297/238; 297/230.1; 297/144; 297/146
(58) Field of Search .............................. 297/129, 188.1, 297/238, 233, 234, 235, 230.1, 144, 146

(56) References Cited

U.S. PATENT DOCUMENTS

| | | | | |
|---|---|---|---|---|
| 352,723 A | * | 11/1886 | Weeden | 297/112 |
| 440,974 A | * | 11/1890 | Thomas | 297/12 |
| 961,169 A | * | 6/1910 | Shear | 297/112 |
| 1,267,290 A | * | 5/1918 | Tubbs | 297/43 |
| 1,279,414 A | * | 9/1918 | Okun | 297/234 |
| 1,335,973 A | * | 4/1920 | Kesselman | 297/107 |
| 1,377,868 A | * | 5/1921 | Bezold | 297/11 |
| 1,424,302 A | * | 8/1922 | Helms | 297/184.11 |
| 1,722,074 A | * | 7/1929 | Chapleau | 297/188.1 |
| 2,116,366 A | * | 5/1938 | Scott | 297/43 |
| 2,621,708 A | * | 12/1952 | Luce | 297/117 |
| 2,699,202 A | * | 1/1955 | Leary et al. | 297/233 |
| 3,873,114 A | * | 3/1975 | Brown | 280/30 |
| 4,460,188 A | * | 7/1984 | Maloof | 280/30 |
| 4,496,189 A | * | 1/1985 | Tanizaki et al. | 297/63 |
| 5,269,157 A | * | 12/1993 | Ciminelli et al. | 62/457.7 |
| 5,647,632 A | * | 7/1997 | Fireman | 297/109 |

FOREIGN PATENT DOCUMENTS

GB 2380125 A * 4/2003 ........... A47B/85/00

* cited by examiner

Primary Examiner—Peter M. Cuomo
Assistant Examiner—Sarah C. Burnham
(74) Attorney, Agent, or Firm—I. Zborovsky

(57) ABSTRACT

A convertible device for seating has a back; a seat, wheels for rolling the device, walls forming a receptacle for storing goods under the seat, the seat being turnable between a sitting position in which it is located substantially horizontally and covers the receptacle from above so that a person can sit on the seat, and a loading position in which the seat is turned and located substantially vertically at a distance from back so that goods can be loaded into the receptacle.

15 Claims, 11 Drawing Sheets

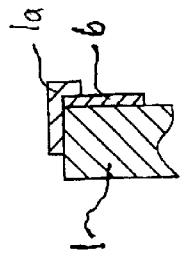
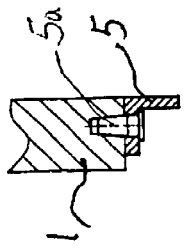
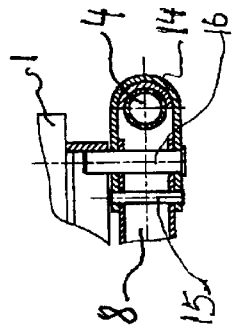
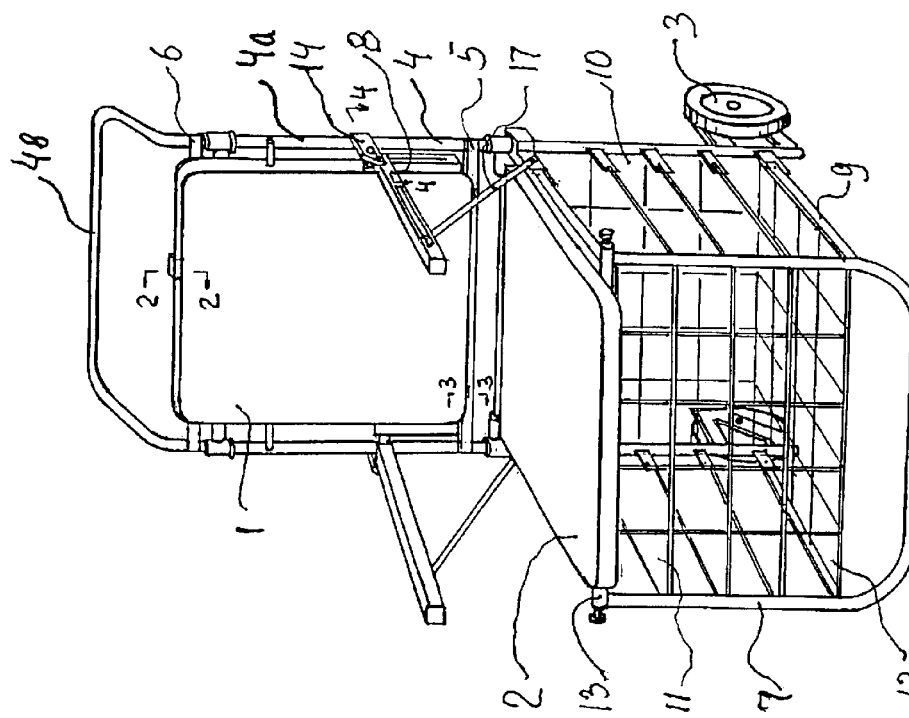

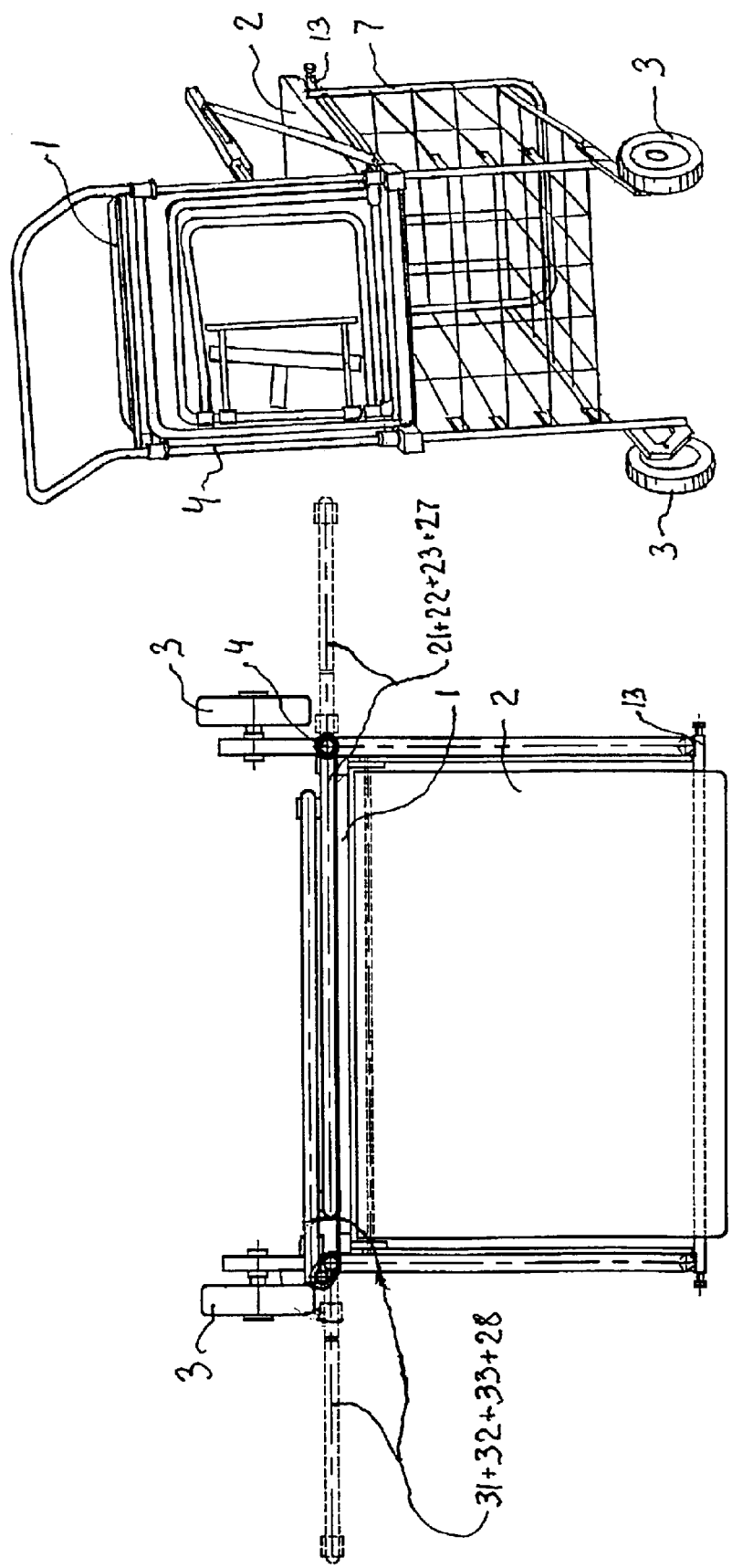

CONVERTIBLE DEVICE FOR SITTING

BACKGROUND OF THE INVENTION

The present invention relates to devices for sitting.

Devices for sitting are known in the art and used in many modifications. It is believed that the existing devices for sitting can be further improved by designing them so as to perform multiple functions.

SUMMARY OF THE INVENTION

Accordingly, it is an object of the present invention to provide a device which is a further improvement of the existing devices for sitting.

In keeping with these objects and with others which will become apparent hereinafter, one feature of the present invention resides, briefly stated, in a convertible device for seating comprising a back; a seat; wheel means for rolling the device; wall means forming a receptacle for storing goods under said seat, said seat being turnable between a sitting position in which it is located substantially horizontally and covers said receptacle from above so that a person can sit on said seat, and a loaded position in which said seat is turned and located substantially vertically at a distance from back so that goods can be loading into said receptacle.

When the device is designed in accordance with the present invention, it can serve as a chair for sitting and at the same time as a storage space for storing goods to be transported as a shopping cart.

In accordance with a further feature of the present invention, additional chair means can be located at one side or at both sides of the main back and seat, and also turned to be behind the back in the position of non use. Therefore, the device can be used for sitting of tow or three people side by side. Also, additional elements can be provided, for example a plate forming a table, or a plate forming a support of lying, thus allowing the same wheelchair to be used for eating on the table plate and for lying on the lying plate.

The novel features which are considered as characteristic for the present invention are set forth in particular in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWINGS

FIG. 1 is a perspective view of a convertible device for sitting in accordance with the present invention;

FIGS. 2, 3 and 4 are views showing sections of the convertible device for sitting of FIG. 1, taken along the lines 2—2, 3—3 and 4—4;

FIGS. 12, 13 and 14 are views showing successive steps of folding of the inventive convertible device for sitting;

DESCRIPTION OF THE PREFERRED EMBODIMENTS

Figure 15:
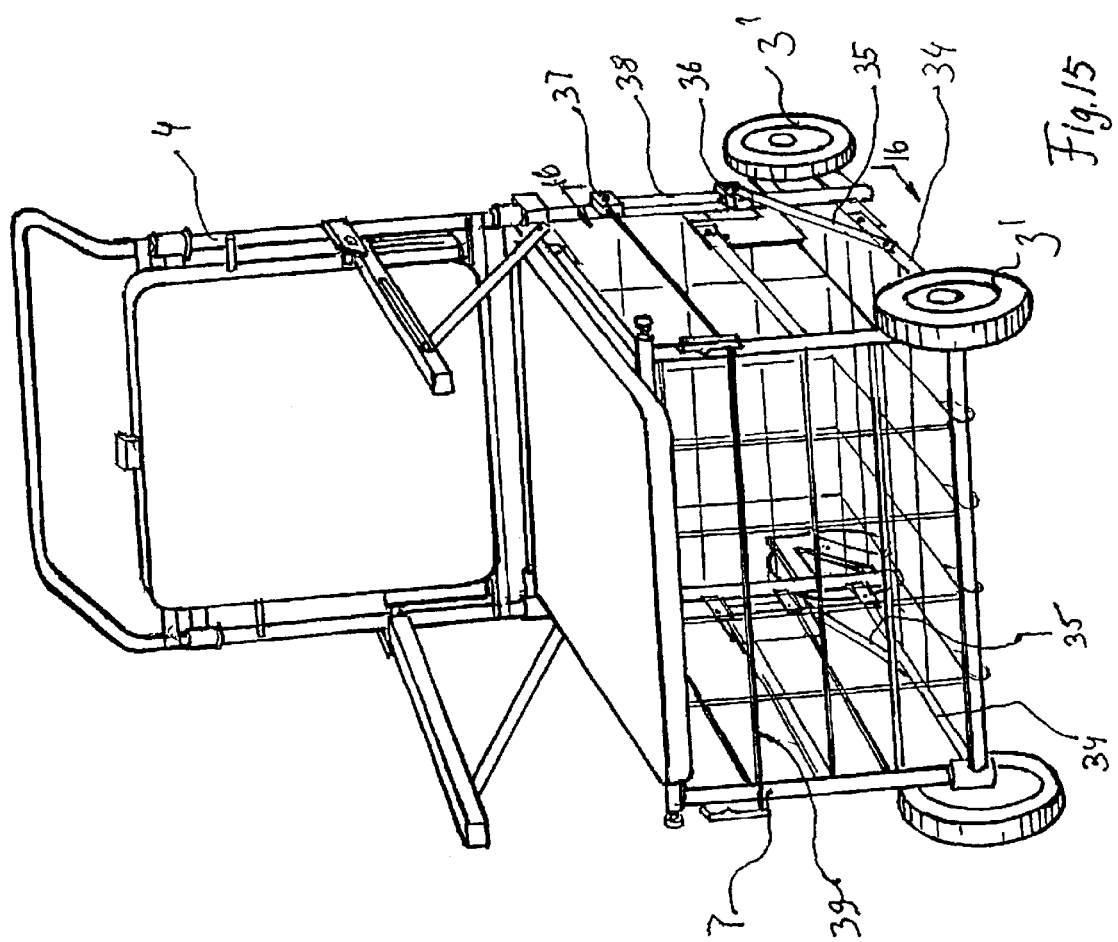
FIG. 15 is a view showing the inventive convertible device for sitting provided with four wheels.

A device in accordance with the present invention has a back which is identified with reference numeral 1 and a seat which is identified with reference numeral 2. It is further provided with wheels. The wheels can including two wheels 3 as shown in FIG. 1 or four wheels 3' as shown in FIG. 15. The device has a frame identified a whole with reference numeral 4. The frame includes rear vertical supports 4a which upwardly end in a handle 4b, front vertical supports 7 which downwardly end in a horizontal bar 7a and connecting elements between the supports identified with reference numeral 9.

Parts 5 and 6 are welded to the frame 4 and are operative for holding the back 1 in a vertical position. Part 14 is provided for connection with the armrest 8 and the back 1. This is clearly shown in FIGS. 2, 3 and 4. FIG. 2 shows that the part 6 is located between the back 1 and a part 1 a which is welded at the top of the back 1. FIG. 3 shows that at the bottom the back 1 is introduced into two axles 5a. FIG. 4 shows that the part 14 is welded to the frame 4. Two axles 15 and 16 are provided in the part 14. The armrest 8 is turnable on the axle 15 and held in a horizontal position by abutting against the axle 16 and the part 17. The part 17 turns together with the armrest 8 when it turns upwardly. The armrest 8 and all parts connected to it are located at the left side and the right side of the chair shown in FIG. 1. The axle 13 is welded with the pipes 7.

In accordance with the present invention a receptacle 10 is formed underneath the seat 2. It is formed by a plurality of walls 11 and a bottom 12. The walls 11 and the bottom 12 can be formed by intersecting wire-shaped or bar-shaped elements.

Figure 6:
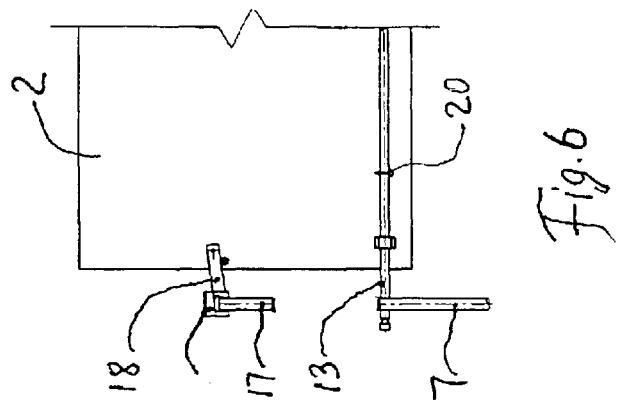
FIG. 6 is a view showing the fragment of the convertible device for sitting shown in FIG. 5.
Figure 5:
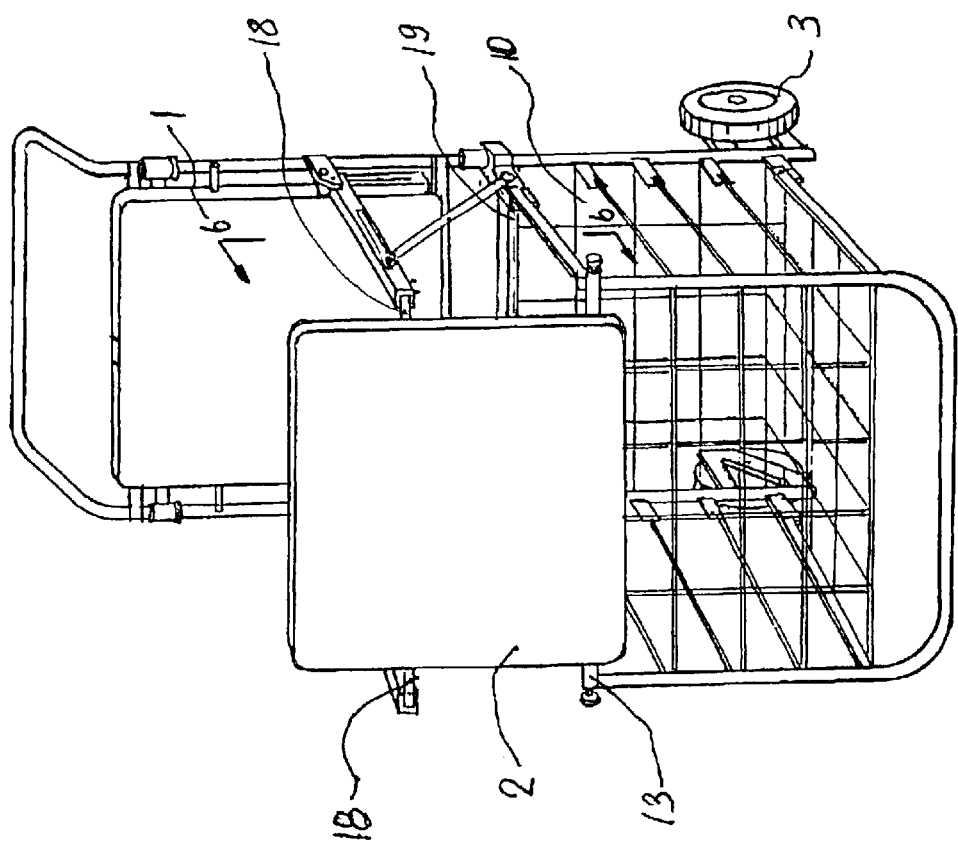
FIG. 5 is a view substantially corresponding to the view of FIG. 1, but showing the convertible device for sitting in a position in which it is ready for loading of goods into its receptacle.

The seat 2 is movable between two positions. As shown in FIGS. 1 and 15, the seat 2 can be located in substantially horizontal position, so that a person can sit on the seat 2 for stationary rest. In this position the seat 2 forms an upper cover for the receptacle 10. The seat 2 is turnable to another position which is shown in FIG. 5. In this position the seat 2 extends substantially vertically and opens the receptacle 10 from above, so that goods can be loaded then into the receptacle 10 from above. At the same time in this position the seat 2 together with the back 1 form vertical guides for guiding the goods during loading into the receptacle 10. The movement of the seat 2 between the position shown in FIGS. 1 and 15 and the position shown in FIGS. 5 and 6 is performed by turning on the axle 13 located in the front area of the device, so that the seat 2 is turned with its back upper edge moving counterclockwise from the horizontal position to the vertical position. In the horizontal position the front edge of the seat 2 is supported on the turning axle 13, while its rear edge is support on an axle 19 directly under the back 1. The seat 2 turns on the axle 13 over 90° and abuts against a part 20, as shown in FIG. 6. Moreover, the seat 2 abuts against two parts 18, as shown in FIGS. 5 and 6.

Figure 7:
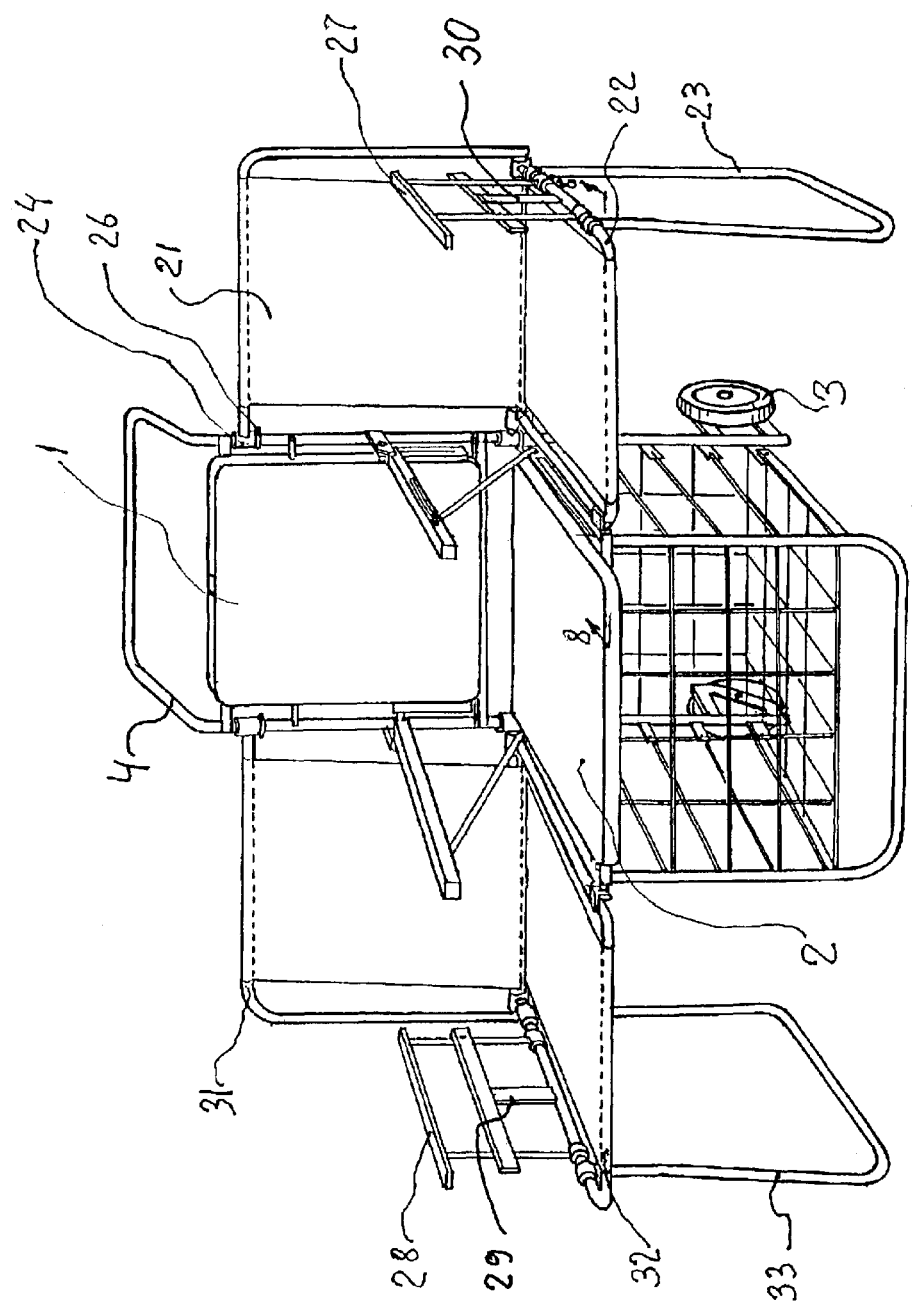
FIG. 7 is a view showing the inventive convertible device for sitting with two additional chair elements.
Figure 8:
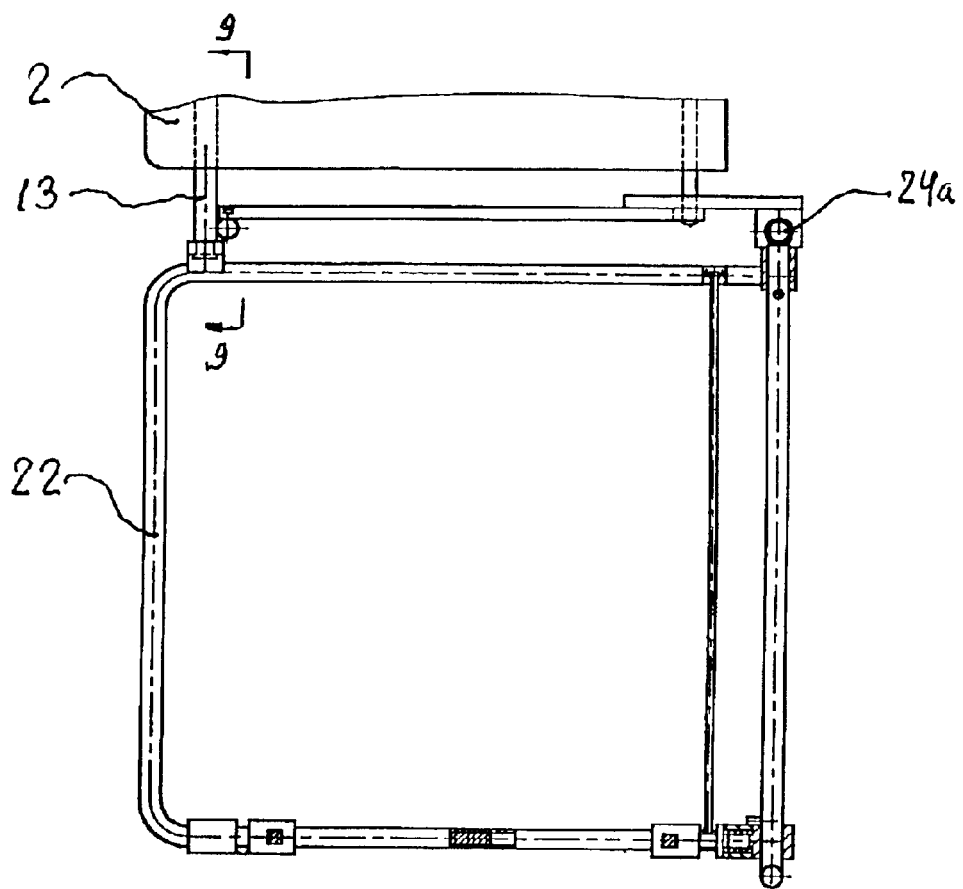
FIG. 8 is a view showing a detail of the inventive convertible device for sitting.

FIG. 7 shows a further modification of the inventive armchair. The armchair here is provided with an additional back 21 and an additional seat 22. The additional back 21 and the additional seat 22 are located laterally of the first mentioned back 1 and the first mentioned seat 2. They form a sitting area for another person. The additional seat 22 is supported on an additional support 23. The elements 21 and 31 are connected to the frame 4 by rings from below and from above. The rings 24 are welded to the pipe of the back 21 and is located on the pipe 4 as shown in FIG. 1. The ring 24 together with the back 21 is arranged on a part 26 which is welded to the frame 4. The back 21 with the ring 24 turns when necessary around the pipe of the frame 4. The same is true with respect to the lower ring of the back 21 (24a in FIG. 8), and also relates to the back 31 of the other chair.

Figure 11:
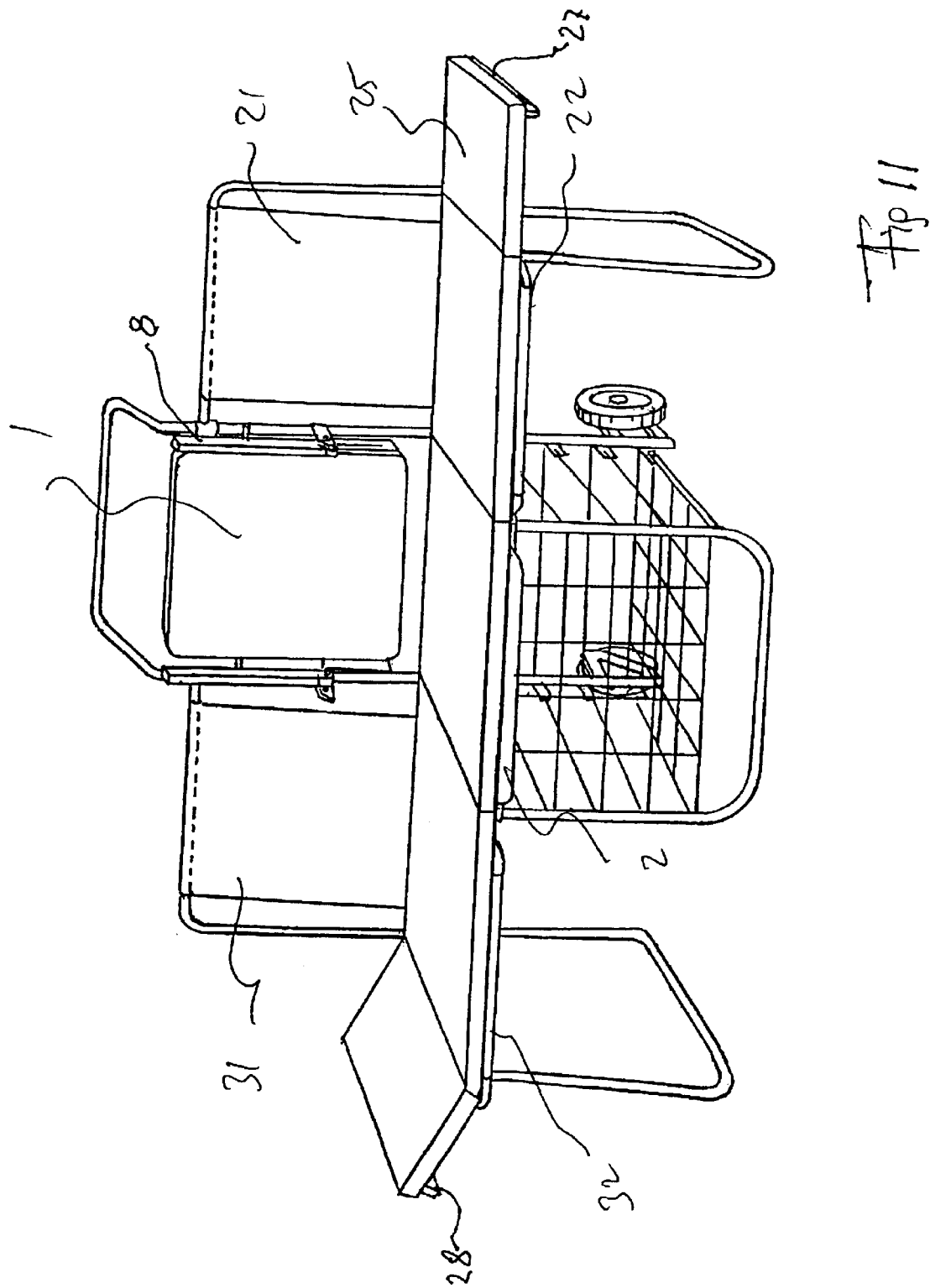
FIG. 11 is a view showing the convertible device for sitting in accordance with the present invention, with two additional chair elements and a plate for providing a lying support.

The armrests 27 and 28 are connected to the corresponding chairs 22 and 32 and fixed manually by parts 29 and 30. The armrests are capable of turning over 270° when folded, and also can be fixed during turning over 90° and 45° as shown in FIG. 11.

Figure 9:
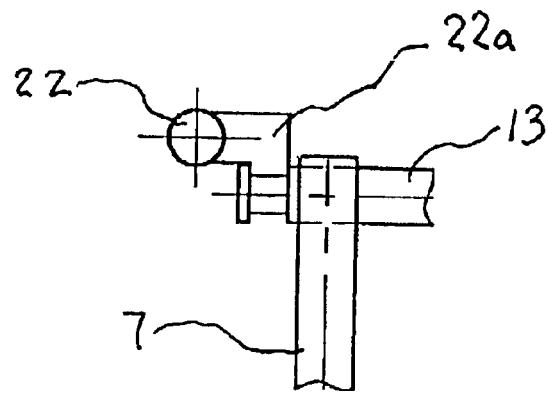
FIG. 9 is a view showing a section of the convertible device for sitting of FIG. 8, taken along the line 3—3.

As explained herein above, the seats 22 and 32 are supported by supports 23 and 33. Moreover, the seats 22 and 32 are additionally held on the main chair, as can be seen from FIGS. 8 and 9. A part 22a is welded to the chair 22, and in a horizontal position it is introduced into the axle 13 which is welded to the pipes 7. The same is true with respect to the seat 32.

Figure 10:
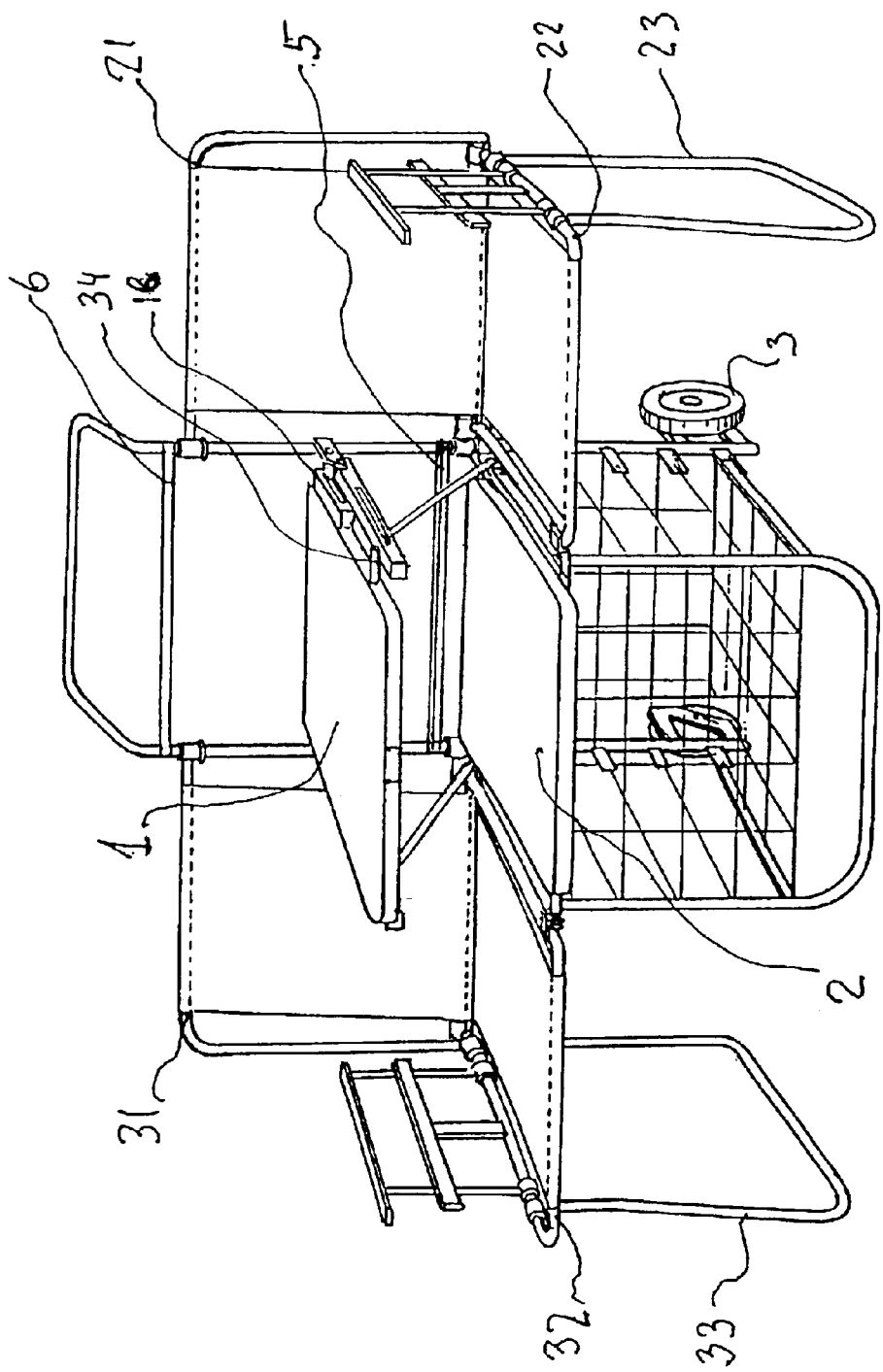
FIG. 10 is a view substantially corresponding to the view of FIG. 7, but showing the inventive convertible device for sitting with an additional table plate-like element, in which a table-like support is formed.

FIG. 10 shows that the back 1 can be turned by 90° and thereby form a table. As explained above with references to FIGS. 1, 2, 3 and 4, the back 1 is vertically supported without screws. Therefore, it is very easy to lift it by hands, after releasing it from the parts 6, 5 and 5a, and turn over 90° around the axles 16, which are introduced in the parts 1b of the back 1. In addition to turning around the axles 16, it is possible to move the back 1, when it's turned over 90°. This makes possible to arrange the table in a convenient place. When the back 1 is turned, it abuts against the armrests 8 by the parts 34 which are inserted in the back 1.

Figure 12:
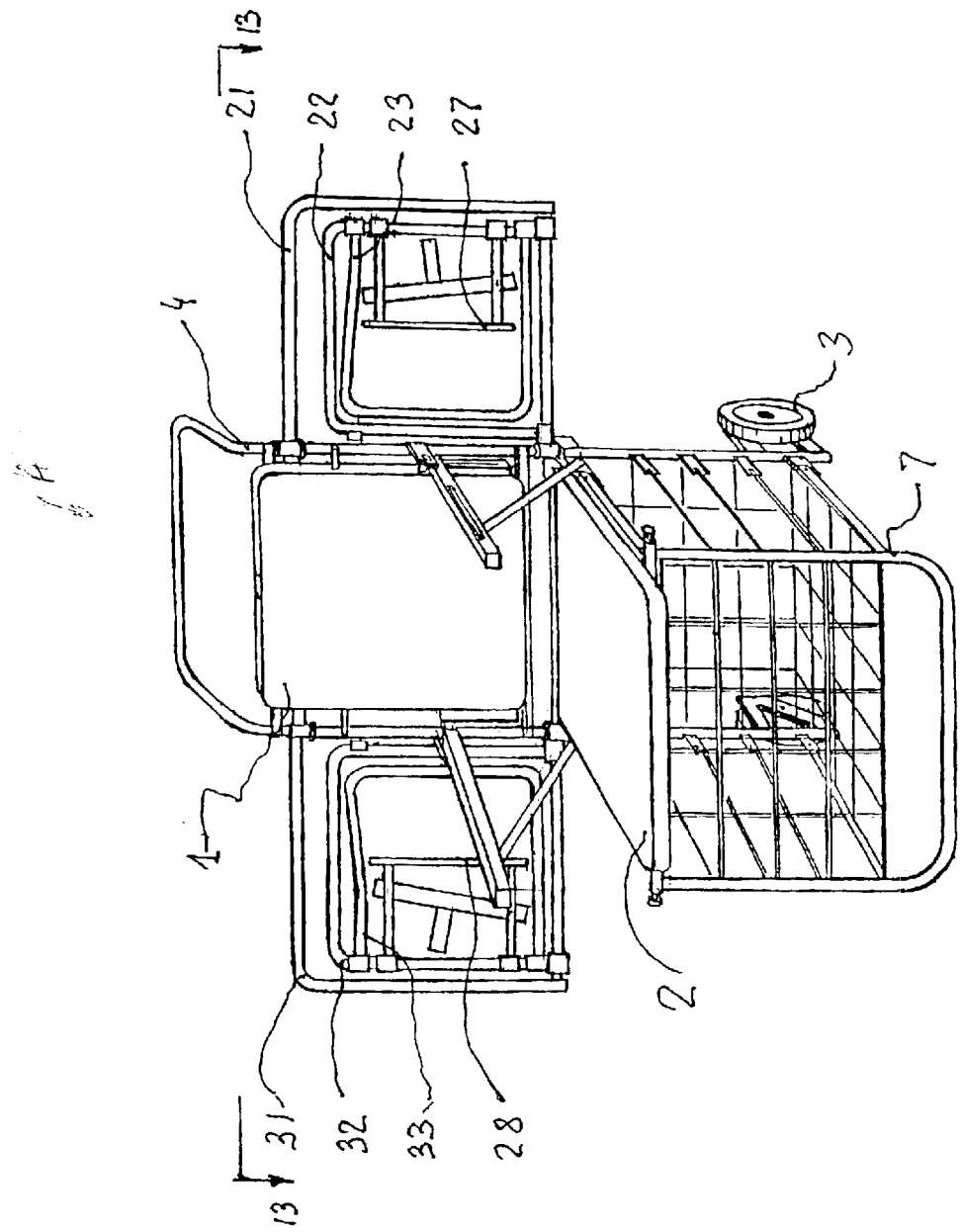

The additional chair elements 21, 22, 23 and 31, 32, 33 are foldable and turnable to be located behind the first mentioned back 1 as shown in FIG. 14. First the supports 23 and 33 are turned around horizontal axis to be located under the seats 22 and 32, then the seat 22, the support 23 and the seat 32 with the support 33 are turned around another horizontal axis so as to be located coextensive with the back 21 and the back 31 correspondingly as shown in FIG. 12. Finally, the elements 21, 22, 23 and 31, 32, 33 are turned about vertical axis so as to be located behind the back 1, as shown in FIGS. 13 and 14.

It is to be understood that in order to provide this turning motions, the corresponding parts are connected with one another so as to be turnable about pivot axes, for which purpose corresponding pivot means are provided such as for example a bar, and a ring connected to a corresponding part and turnable around the bar as shown for example in FIG. 10 for the connection between the support 23 and the seat 22, and between the support 33 and the seat 32.

An important feature of the present invention is that the back 1 can be deflectable. For example it can be composed of a fabric which slightly moves perpendicularly to its plane.

In this construction when the additional chair 21, 22, 23 is turned to be located behind the back 1, the back 1 is located so that behind it there if a free space with a diameter which is equal to the diameter of the pipe 4. Therefore, the parts 21, 22, 23 and 27 folded together can be accommodated there.

As shown in FIG. 11, in the position of the chair elements of FIG. 10, an additional plate can be placed on the seats 32, 2, 22 and the armrests 27 and 28 so as to form a support for a lying person. The plate is identified with reference numeral 25. It can be composed of a plurality of pieces, which can be folded over one another so as to form a single composite plate, or unfolded and placed on the seats 32, 2, 22 and the armrests 27 and 28 as shown in FIG. 11. The armchair 27 is turned by 90°, and the armchair 28 is turned by 45° for the head.

In contrast to existing chairs, in which during the folding the seat, the back and the legs are pressed against one another and a thickness of the device is equal to the combined thickness of these elements, this is not so in the present invention. As can be seen from FIG. 12, the device of the present invention in a different way. The armrest 27 is introduced into the interior of the leg 23, then the armrest 27 and the leg 23 are introduced into the interior of the seat 22, and the seat 22 together with the leg 23 and the armrest 27 are introduced into the interior of the back 21. The same is true with respect to the left chair with its parts 28, 33, 32 and 31.

FIG. 13 shows that the folded chairs have a width which does not exceed beyond the pipe of the back 21 and 31. The folded chairs are turned by 180° and introduced into the rear part of the device, practically without increasing the dimensions of the device as shown in FIG. 14.

Figure 16:
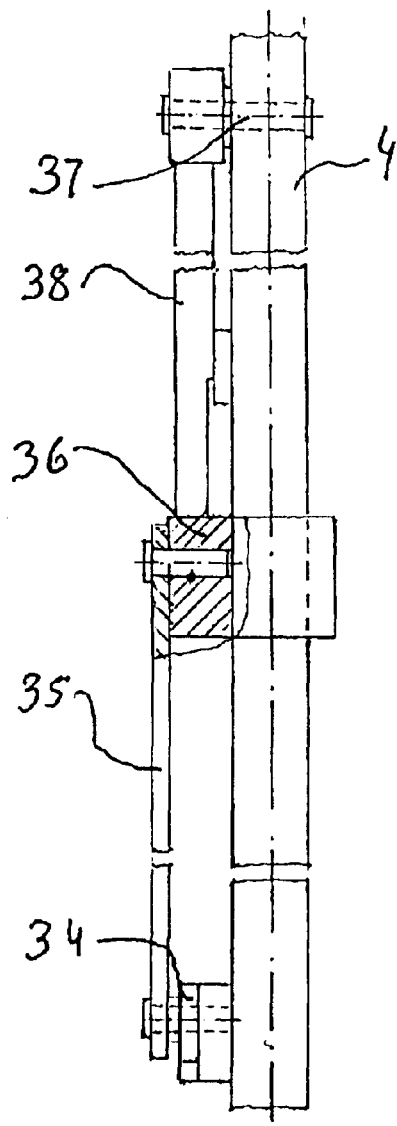
FIGS. 16 and 17 are views showing further details of the inventive convertible device for sitting.
Figure 17:
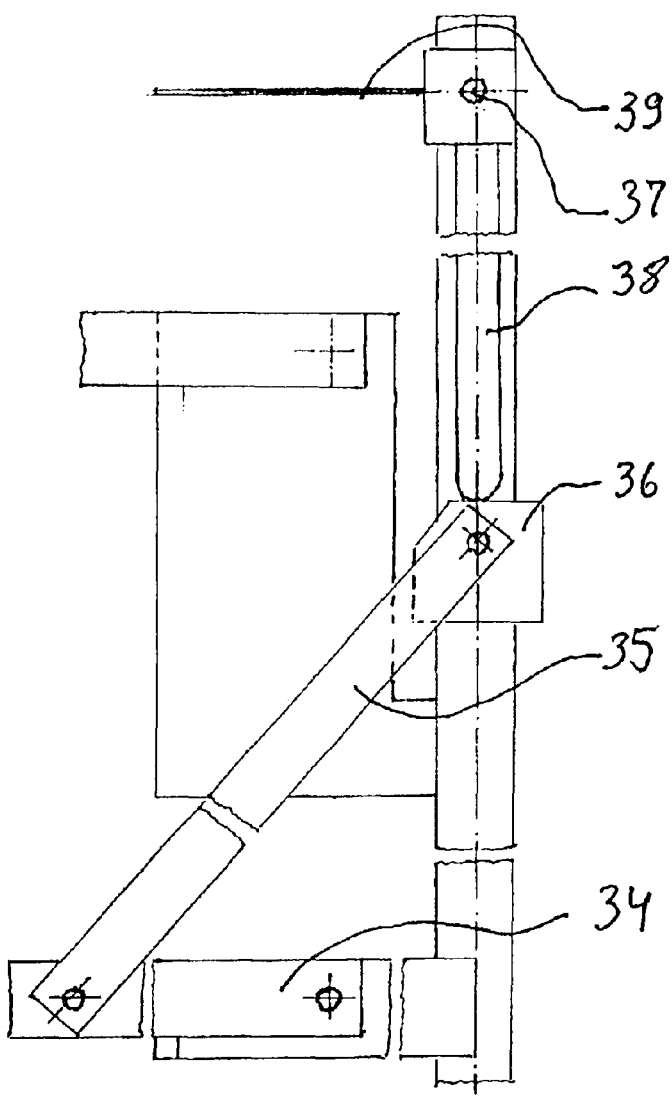

FIG. 15 illustrates a device with four wheels. The rear wheels are connected to the frame 4, while the front wheels are connected to the front frame 7. Both frames are connected to one another from both sides by a few horizontal turnable parts. The lower parts 34 are affixably connected to the frame 4 by the parts 35, so that a normal movement of the device is performed. This is also clearly seen in FIGS. 16 and 17. The parts 35 are connected with the parts 36 which can move vertically at both sides of the frame 4. The parts 36 are held by parts 38 which are connected to the frame by axles 37.

During folding manually the part 39 is lifted, which turns the part 38 and releases the part 36, and then a folding of the device is performed.

Figure 18:
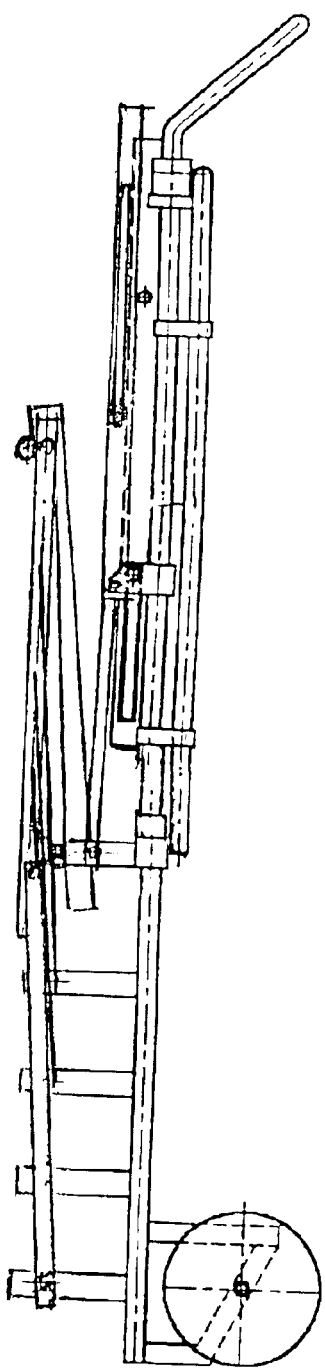
FIG. 18 shows the inventive device in a folded condition.

FIG. 18 shows a view of the folded device in accordance with FIG. 1 and two chairs behind it.

It will be understood that each of the elements described above, or two or more together, may also find a useful application in other types of constructions differing from the types described above.

While the invention has been illustrated and described as embodied in wheelchair, it is not intended to be limited to the details shown, since the various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of the prior art, fairly constitute essential characteristics of the generic or specific aspects of the invention.

What is claimed as new and desired to be protected by Letter Patent is set forth in the appended claims.

What is claimed is:

1. A convertible device for seating comprising a back; a seat; wheel means for rolling; wall means for forming a receptacle for storing goods under said seat, said seat being turnable between a sitting position in which it is located substantially horizontally and covers said receptacle from above so that a person can sit on said seat, and a loading position in which said seat is turned and located substantially vertically at a horizontal distance from said back so that said back and said vertically located seat in said loading position form two horizontally spaced vertical guides for guiding the goods during loading into said receptacle from above; and additional chair means including at least an additional back located laterally relative to said back, and an additional seat located laterally relative to said seat, said additional seat and said additional back being folded toward one another and jointly turnable to be located behind said back.

2. A convertible device for seating as defined in claim 1, wherein said seat is turnable about a substantially horizontal axis which is spaced from said back.

3. A convertible device for seating as defined in claim 1, wherein said wheel means include two wheels.

4. A convertible device for seating as defined in claim 1, wherein said wheel means include four wheels.

5. A convertible device for seating as defined in claim 1; and further comprising a table plate which is formed by displacing said back.

6. A convertible device for seating as defined in claim 1, wherein said back is formed of a material which is displaceable so that when said additional seat and additional back is placed behind the seat, said additional back and said additional seat at least do not increase significantly a thickness of a back area.

7. A convertible device for seating as defined in claim 1, wherein said additional chair means also includes leg means and armrest means formed so that said leg means, armrest means and said additional seat are foldable to be located inside said back.

8. A convertible device for seating as defined in claim 1; said additional chair means comprising two additional chairs each having an additional back, an additional seat, additional legs and additional armrests, said additional seat, additional legs and additional armrests of each of said additional chairs being foldable to be located inside said additional back of each of said additional chairs, and both said additional chairs being foldable to be located inside said back.

9. A convertible device for sitting as defined in claim 1, wherein said additional chair means is foldable so that when said additional chair means is folded it has a width which does not exceed beyond a pipe of said additional back.

10. A convertible device for sitting as defined in claim 9, wherein said additional chair means is turnable by 180° and introducible into a rear part of the device without increasing dimensions of the device.

11. A convertible device for seating comprising a back; a seat; wheel means for rolling; wall means for forming a receptacle for storing goods under said seat, said seat being turnable between a sitting position in which it is located substantially horizontally and covers said receptacle from above so that a person can sit on said seat, and a loading position in which said seat is turned and located sustantially vertically at a horizontal distance from said back so that said back and said vertically located seat in said loading position form two horizontally spaced vertical guides for guiding the goods during loading into said receptacle from above and an additional back located laterally relative to said back, and additional seat located laterally relative to said seat, said additional seat and said additional back being folded toward one another and jointly turnable to be located behind said back; and further comprising a further back located laterally of said back at an opposite side of said additional back, and a further seat located laterally of said seat and at opposite side of said additional seat, said further back and said further seat being foldable toward one another and turnable to be located behind said back; two pairs of armrests associated with said back, an additional armrest associated with said seat, an additional armrest associated with said additional seat, and a further armrest associated with said further seat, all said armrests being also foldable to be located behind said back; and means forming a bed-like support and including a plate placeable on said first mentioned seat, said additional seat and said further seat.

12. A convertible device for seating as defined in claim 11, wherein said plate is composed of several members which are foldable over one another.

13. A convertible device for seating as defined in claim 11; and further comprising armrests which are movable between a supporting position in which they support arms of a user sitting on said seat and a withdrawn position in which they are withdrawn so as to allow said plate to be placed on said seats.

14. A convertible device for sitting as defined in claim 11, wherein said additional seat and said further seat are foldable so that in a folded position said additional seat and further seat have a width which does not exceed beyond a pipe of said additional back and said further back correspondingly.

15. A convertible device for sitting as defined in claim 14, wherein said additional back with said additional seat and said further back with said further seat are turnable by 180° and introduced into a rear part of the device without increasing dimensions of the device.

* * * * *